United States Patent [19]

Vetter

[11] Patent Number: 4,859,392
[45] Date of Patent: Aug. 22, 1989

[54] PROCESS AND DEVICE FOR THE PRODUCTION OF PLASTIC FILMS

[75] Inventor: Heinz Vetter, Rossdorf, Fed. Rep. of Germany

[73] Assignee: Rohm GmbH Chemische Fabrik, Darmstadt, Fed. Rep. of Germany

[21] Appl. No.: 198,051

[22] Filed: May 24, 1988

[30] Foreign Application Priority Data

Jun. 6, 1987 [DE] Fed. Rep. of Germany ....... 3719242

[51] Int. Cl.$^4$ ............................................. B29C 59/04
[52] U.S. Cl. .................... 264/166; 264/175; 264/210.2; 425/224; 425/363; 425/368
[58] Field of Search ............ 264/141, 166, 175, 210.2; 425/296, 224, 363, 368, 329, 335, 327

[56] References Cited

U.S. PATENT DOCUMENTS

| | | | |
|---|---|---|---|
| 2,236,214 | 3/1941 | Jones | 264/175 |
| 4,014,636 | 3/1977 | Pawelczyk | 425/363 |

FOREIGN PATENT DOCUMENTS

| | | |
|---|---|---|
| 124265 | 8/1931 | Austria . |
| 1213107 | 3/1966 | Fed. Rep. of Germany . |
| 1251188 | 9/1967 | Fed. Rep. of Germany . |
| 1504816 | 9/1971 | Fed. Rep. of Germany . |
| 3319279 | 12/1984 | Fed. Rep. of Germany . |
| 3421800 | 4/1986 | Fed. Rep. of Germany . |
| 3013576 | 9/1986 | Fed. Rep. of Germany . |
| 56-62122 | 5/1981 | Japan . |
| 57-22019 | 2/1982 | Japan . |
| 59-57720 | 4/1984 | Japan . |

Primary Examiner—Jan H. Silbaugh
Assistant Examiner—Jill L. Heitbrink
Attorney, Agent, or Firm—Oblon, Spivak, McClelland, Maier & Neustadt

[57] ABSTRACT

A smooth film web is used as a smoothing surface in the nip between a cooling roll and a pressure roll. The pressure roll need not be coolable, and it preferably has an elastic surface layer. Since the elastic surface layer does not come into immediate contact with the extruded web, it need not be highly polished. Consequently, a high running time is achieved.

9 Claims, 1 Drawing Sheet

PROCESS AND DEVICE FOR THE PRODUCTION OF PLASTIC FILMS

FIELD OF THE INVENTION

The invention relates to a process and a device for the production of smooth plastic films, especially those with a thickness of less than 300 micrometers, by extrusion of a plastic melt from a slot die and smoothing of the extruded web in a calender stack.

BACKGROUND OF THE INVENTION

Smoothing of films under 300 micrometers in a calender stack is difficult, since the melt in the smoothing nip exhibits transition. Therefore it is practically impossible to equalize variations in thickness of the extruded web by a bead of thermoplastic compound on the roll intake in front of the nip. According to DE-AS 1 251 188, a satisfactory two-sided smoothing is indeed achieved if the nip is formed from a polished steel roll and a highly polished rubber roll. However, highly polished rubber rolls endure for only short running times. Also, pressure rolls made from other materials with a substantially lower E modulus than steel (for instance, polyamide—which, according to DE-C 3 013 576, can also be used) have a limited running time.

According to DE-C 3 421 800, a longer running time is achieved with a pressure roll which comprises a covering made from elastic material and, over the covering, a tubular thin-walled smoothing shell of polished steel. However, rolls of this configuration are more rigid than rubber rolls. This results in closely adjacent thickness variations in the melt web not being equalized, since the web does not contact the rolls with its complete surface. Optical defects are the result.

OBJECT OF THE INVENTION

The object of the invention is to provide a process and a device suitable for carrying out the process to achieve in the nip of a calender stack during a practically unlimited running time a satisfactory two-sided smoothing of thin webs formed from extruded plastic.

SUMMARY OF THE INVENTION

The basic idea of the invention is the use of a smoothed film web as a smoothing surface of the pressure roll in the nip. Hereinafter, the smooth film web is called a "smoothing film". The pressure roll need not be able to be cooled, and it preferably has an elastic surface layer. Since the elastic surface layer does not come in immediate contact with the extruded web, it need not be highly polished. Consequently a high running time is achieved, which perhaps is limited by material fatigue and the like, but which it not limited by a change of the surface quality.

The thickness of the extruded web results from the extrusion performance of the slot die and from the take-off speed of the smoothing rolls. These two magnitudes must be adjusted to one another so that the extruded web enters into the nip with the desired set thickness. A distance between the roll surfaces corresponding to the web thickness is automatically produced in the nip.

The preferred idea of the invention consists in the fact that film web—produced, smoothed, and cooled by the process—is itself used as a smoothing film. It is especially advantageous to feed back directly as a smoothing film into the nip the web coming from the nip, which has been smoothed on the cooled smoothing roll, and then remove it as product. Surprisingly, the film running through the nip as a smoothing film is not heated by the hot entering extruded film web to such an extent that the webs are fused together. Accordingly, the two films can easily be separated from one another after leaving the nip.

BRIEF DESCRIPTION OF THE DRAWINGS

Two embodiments of the preferred method of operation are diagrammatically represented in FIGS. 1 and 2.

DETAILED DESCRIPTION OF THE PRESENTLY PREFERRED EMBODIMENTS

Figure 1:
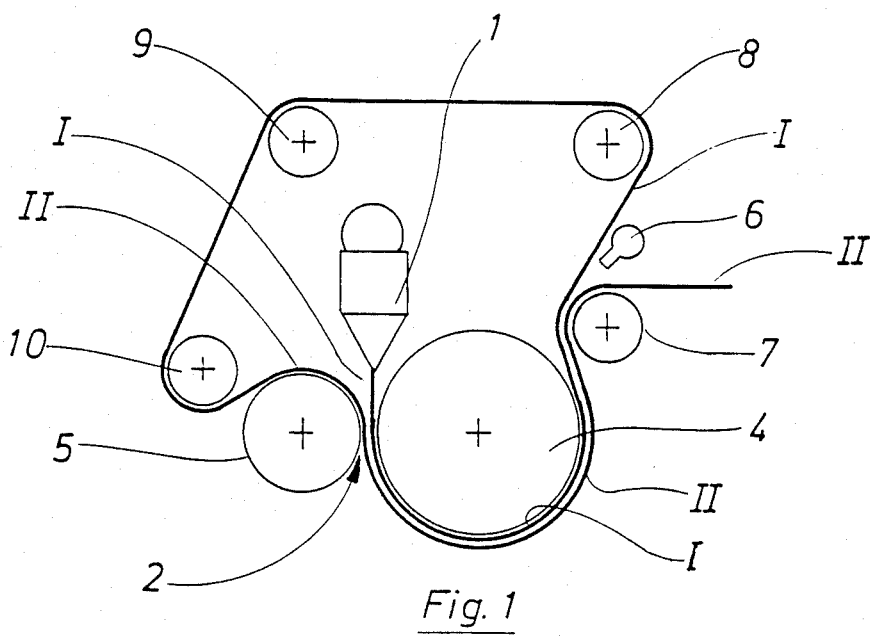
FIG. 1 shows in sectional view a first embodiment of the roll arrangement.

According to the process of the invention, any thermoplastic can be processed which can be extruded and which is suitable for production of thin plastic films. However, the invention is particularly well suited for thermoplastics with a glass temperature above 50° C. and an E modulus above 50 N/mm$^2$. Such thermoplastics include polymethyl methacrylate, polycarbonate, polyolefins, thermoplastic polyesters, polystryrene and ABS plastics, polyvinyl chloride, polysulfones, polyethers, polyetherimides, and polyether ether ketones.

The thickness of the produced film can be in the range of from 5 micrometers to 1 mm and is generally far under 300 micrometers, especially in the range of from 10 to 100 micrometers. The extrusion takes place in the usual way from a flat film die 1 which is placed close to a nip 2.

The smoothing process operates according to the principle of the chill roll process, in which an extruded web I runs between a cooling roll 4 and a pressure roll 5 and is quickly cooled below the softening temperature. The cooling roll 4 generally has a greater diameter than the pressure roll 5. The peripheral speeds of the two rolls 4 and 5 are generally equal, but a slight friction is not disadvantageous. The pressing pressure between the rolls 4 and 5 depends on the elasticity of the pressure roll 5. If the pressure roll 5 consists of a rubber or similar material with a Shore hardness in the range of 60 to 95, then a line pressure of 1 to 100 N/cm can be used. If an unelastic or slightly elastic pressure roll made of a material with an E modulus above 1500 N/mm$^2$ is used, a line pressure above 100 N/cm is advantageous.

The surface of the cooling roll 4 is generally highly polished. However, the surface of the cooling roll 4 can also have another characteristic structure, if this structure is to be transferred to the film surface—for example, a delustering or ornamenting. The term "smoothing" is taken here in a broad sense and includes any formation of a desired uniform surface structure and a uniform thickness. However, the term "smoothing" preferably indicates the production of a high polish.

The temperature of the extruded plastic web and the cooling roll are adjusted to one another as usual so that the desired smoothing is achieved, but no fusion takes place. In any case, the extruded web I is to have a temperature in the thermoplastic range of the plastic, which is below the temperature at which the two webs I and II would fuse together. The cooling roll 4 is suitably set at a temperature close to the softening temperature of the extruded plastic, so that the plastic web at the spot where it is taken from the cooling roll barely adheres any longer. Generally the web I mainly or exclusively is cooled on the side adjacent to the cooling roll 4. The pressure roll 5 can also be cooled or brought to a moderate temperature, but generally this is dispensed with. The double web I/II follows the cooling roll 4 on a sufficient part of its periphery to cool the extruded web I below the softening temperature (glass temperature according to DIN 7724) over its entire thickness. Then the double web I/II runs off the cooling roll 4 and is separated into two webs I and II on a separation roll 7.

The smoothing film (i.e., the web II) entering into the nip 2 with the extruded web I can differ in thickness or material from the extruded web I, but it is so chosen that no fusion occurs in the nip 2. This is not the case if its softening temperature is not below that of the extruded web I and the above-mentioned conditions are met. It is advisable for the smoothing film to have the same width as the extruded web I and to cover it completely. The smoothing film transfers its surface structure as a counterplate on the extruded web I. If it is highly polished, which is generally the case, an equivalent highly polished surface is produced on the side of the extruded web I resting against it.

The smoothing film can, for example, be taken continuously from a supply roll and fed into the nip 2. It can also be fed back into the nip as a continuation web after its separation from the smoothed web. In the preferred case, the same film is involved that is formed in the nip from the extruded web I. The side of the film formed on the cooling roll 4 is allowed to act on the extruded web I as a smoothing roll, since otherwise accidental surface defects are again and again transferred to new surfaces. In this case, it is possible to proceed so that the produced film is wound on a roll, then separated from the continuous web and used as a smoothing film, then again wound and taken off as product. This embodiment of the invention is marked by the simplicity of its equipment.

However, it is preferable to feed the smoothed web directly as smoothing film into the nip 2. This can be done by means of an arrangement of deflecting rolls according to FIG. 1 or FIG. 2. According to FIG. 1, the extruded web I is separated on the separation roll 7 from the smoothing web II and is fed by deflecting rolls 8, 9, and 10 to the pressure roll 5. It is advantageous not to let the extruded web I continue to cool on its way to the pressure roll 5. In this arrangement, the flat film die 1 is within the loop formed by the extruded web I, which consequently has to be large enough to be able to perform servicing of the die lips.

Figure 2:
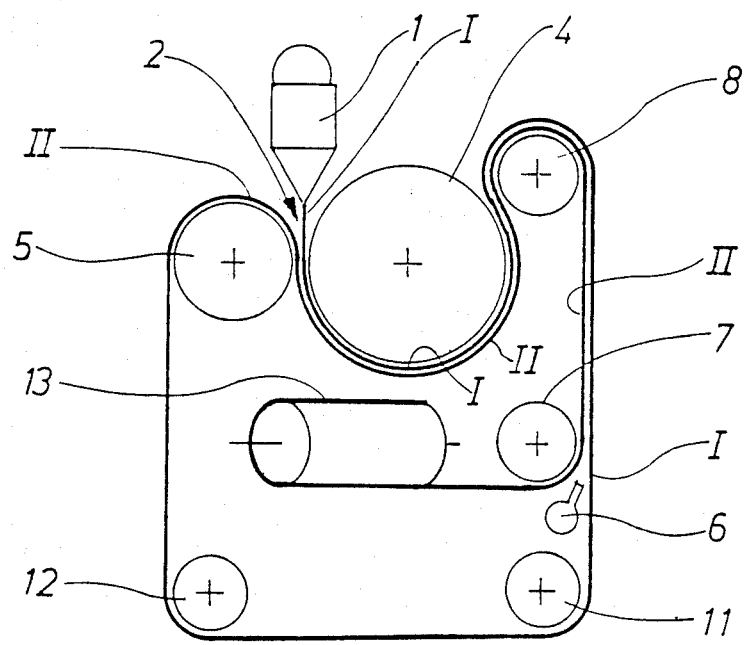
FIG. 2 shows in sectional view a second embodiment of the roll arrangement.

The arrangement according to FIG. 2 allows unhindered access to the flat film die 1. In this case, the extruded web I after separation from the smoothing web II on the separation roll 7 is fed by means of deflecting rolls 8, 11, and 12 to the nip 2 on the side of the calender stack 4, 5 opposite the roll intake. By means of the deflecting roll 13 placed obliquely to the machine direction, the smoothing web II is led out from the space between the calender stack 4, 5 and the extruded web I and is removed as product.

To achieve optimal polish, it can be suitable to feed the double web I/II coming from the nip 2 through at least one more nip and only then to separate the webs I and II from one another. The separation of the webs I and II on separation rolls 7 can be facilitated by an air knife 6. In this case, the formation of electrostatic charge can be counteracted by ionization.

EXAMPLE

On a commercial casting part of chill roll equipment with a mode of operation corresponding to FIG. 1, a 750-mm wide film, 75 micrometers thick, was produced from PMMA molding compound of the PLEXIGLAS zk 30 type as follows:

The melt film was formed from a 900-mm wide flat film die 1, the melting temperature was 245° C., and the die temperature an average of 240° C. The distance from the die mouth to the first point of contact of the melt film onto the cooling roll 4 was 100 mm.

The extruded web I and the smoothing web II warmed to 30° C. (which, during the previous run through the nip 2, had been smoothed on the cooling roll 4) simultaneously entered the nip 2, formed from the pressure roll 5 (outside diameter 200 mm, able to be moderated in heat, roll of steel equipped with rubber shell 10 mm thick with Shore hardness of 80-A) and the cooling roll 4 (polished steel roll of 600-mm diameter, temperature moderated to 100° C.). After a wrap around of 180° on the cooling roll 4, the two film webs I and II after the separation roll 7 (moderated to 40° C., polished steel roll with 80 mm diameter) were separated from one another without the use of an auxiliary agent.

The rate of production was 20 m/min. The pressure roll 5 was pressed against the cooling roll 4 with a line pressure of 12 N/cm. The surface temperature of the rubber at every moment was below 100° C. The film thus produced was highly polished on both sides.

For comparison, the line was operated without entry of the film II. The film surface, which was formed by the rubber covering, was substantially duller than the one on the polished steel roll. After a short running time, the rubber shell heated up so much that the film adhered to the rubber, and thus production was no longer possible. Even by cooling of the roll with cold water to 15° C., it was not possible to avoid inadmissible heating of the rubber surface.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A process for the production of plastic film, said process comprising the steps of:
   (a) extruding a web having a first surface and a second surface from a slot die; then
   (b) passing the web around at least a portion of the periphery of a cooling roll such that the first surface of the web is in contact with the cooling roll; and then
   (c) passing the web between the cooling roll and a pressure roll that is parallel to and spaced from the cooling roll such that, along the line at which the cooling roll is closest to the pressure roll:
      (i) the first surface of an upstream portion of the web is in line contact with the cooling roll;
      (ii) the second surface of the upstream portion of the web is in line contact with the first surface of a downstream portion of the web; and
      (iii) the second surface of the downstream portion of the web is in line contact with the pressure roll.

2. A process as recited in claim 1 and further comprising the step of separating the upstream portion of the web from the downstream portion of the web after step (c).

3. A process as recited in claim 1 wherein the pressure roll has an elastic surface.

4. A process as recited in claim 1 wherein the web has a thickness of less than 300 micrometers.

5. A device for the production of plastic film, said device comprising:
   (a) a slot die for extrusion of a thermoplastic web having a first surface and a second surface;
   (b) a calendar stack placed downstream of said slot die, said calendar stack comprising a cooling roll and a pressure roll forming a nip; and
   (c) means for passing the web between said cooling roll and said pressure roll such that, in the nip:
      (i) the first surface of an upstream portion of the web is in line contact with the cooling roll;
      (ii) the second surface of the upstream portion of the web is in line contact with the first surface of a downstream portion of the web; and
      (iii) the second surface of the downstream portion of the web is in line contact with the pressure roll.

6. A device as recited in claim 5 wherein said pressure roll has a surface formed of an elastic material.

7. A device as recited in claim 5 wherein said means comprises a plurality of deflecting rolls placed axially parallel to said cooling roll and said pressure roll.

8. A device as recited in claim 7 wherein said deflecting rolls define a path for the web around said slot die.

9. A device as recited in claim 7 wherein:
   (a) said deflecting rolls define a path for the web on the side of said calendar stack opposite said slot die and
   (b) another deflecting roll is placed obliquely to said cooling roll between said calendar stack and the path for the web.

* * * * *